Patented Sept. 21, 1954

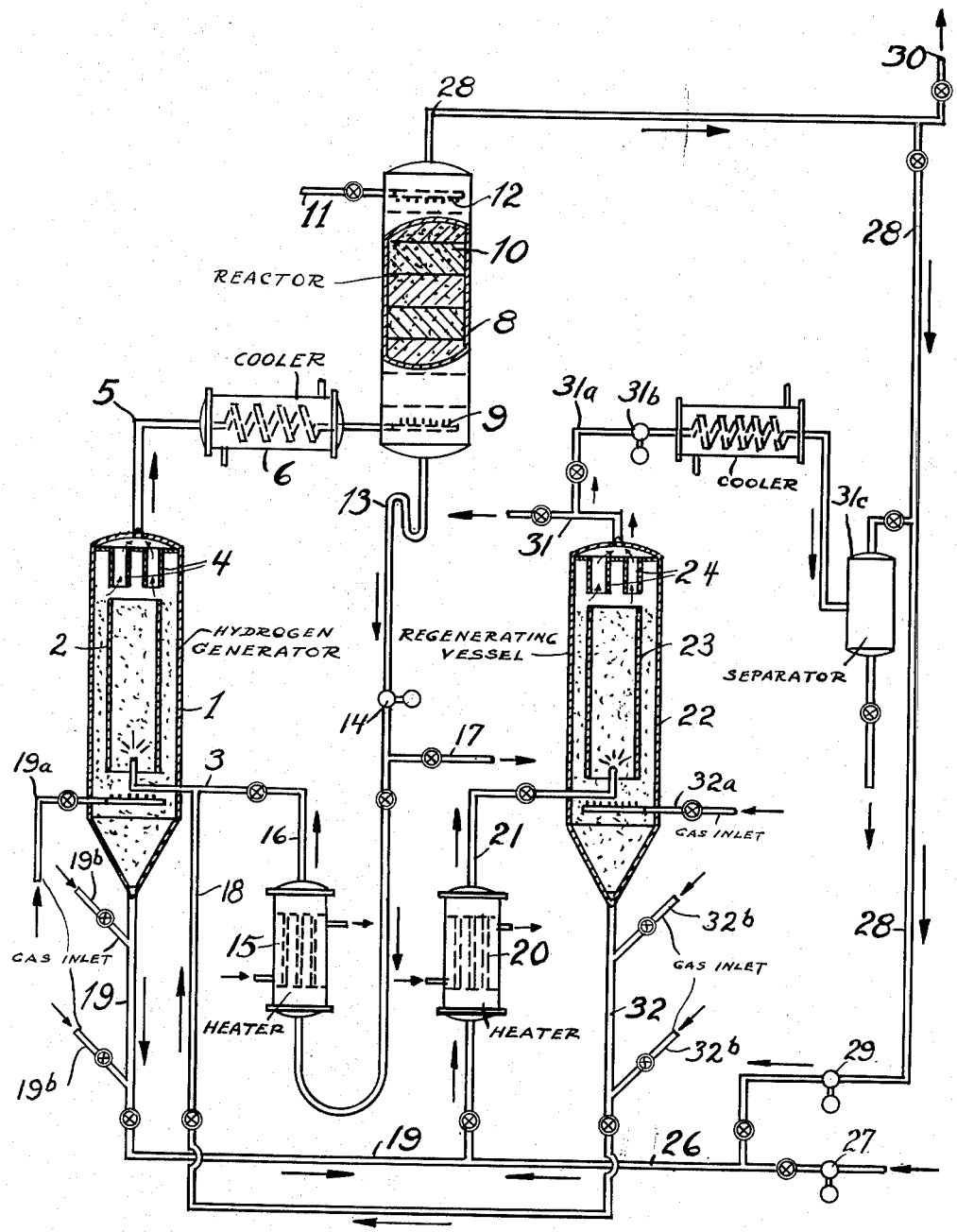

2,689,782

UNITED STATES PATENT OFFICE 2,689,782

PROCESS FOR PRODUCING DEUTERIUM OXIDE

Eger V. Murphree, Summit, N. J., assignor, by mesne assignments, to the United States of America as represented by the United States Atomic Energy Commission Application February 27, 1942, Serial No. 432,615

6 Claims. (Cl. 23—204)

1

The present invention relates to an improved method for producing deuterium oxide or heavy water or, more specifically, to a method for increasing the content of this substance in natural water. The invention will be fully understood from the following description.

The drawing is a semi-diagrammatic view in sectional elevation of an apparatus for carrying out the process and indicates the flow of the materials through the apparatus.

Turning to the drawing, numeral 1 denotes a hydrogen generator or reaction vessel for the production of hydrogen by the reaction of superheated steam and a finely divided metal, such as iron, manganese, and the like, which is capable of reducing the water at the elevated temperature with the formation of hydrogen and an oxide of the metal. The reaction vessel may be constructed in many different ways but must be capable of withstanding heavy pressure and is preferably in an upright or vertical position with an inner vertical wall 2 which is shown in the form of a tube of wide diameter. A "fluidized" mixture of finely divided metal and superheated steam enters the reaction vessel by pipe 3 at the lower end of the tube 2. By the term "fluidized" is meant that the finely divided solid, preferably reduced to a size finer than 50 mesh, is mixed with gas in such proportion that the mixture is made capable of flowing like liquid. For fluidizing from about .005 to .025 cu. ft. of gases per pound of solids is required, but more may be used. This fluidized mass flows upwardly through the inner tube at a velocity designed to maintain the solid particles in suspension and to prevent a complete settling out in the bottom of the vessel. There is preferably a considerable amount of slip between the particles and the gas so that the time of residence of the solid within the reaction chamber may be considerably longer than that of the gases. The material may be said to be in a condition of hindered settling. When the particles reach the upper edge of the pipe 2, the velocity is suddenly decreased due to the increased cross sectional area of the path and two so-called "phases" are then formed, consisting of a less dense suspension which goes upwardly and a heavier or more dense lower phase which flows over the edge of the pipe 2 and downwardly through the annular space between the side walls of the vessel and the tube.

The upper portion of the hydrogen generator or reaction vessel 1 thus acts as a partial separator so that the solid tends to drop out of the gases in this section forming the two gaseous

2 phases. The upper gas phase which contains considerably less solid fines exits through secondary separators indicated at 4 and the gas now practically free of solid passes by means of a pipe 5 to a cooler 6. It will be understood that at this point the gas consists largely of free hydrogen, that is to say a mixture of hydrogen and deuterium. If desired, the solid separating device 4 may be provided in a vessel separate and apart from the reaction vessel, but for reasons of economy it is found desirable to make the two integral as shown. Separation devices may be omitted and the solid carried over may be allowed to accumulate in the apparatus beyond and may be withdrawn as will be described.

Pipe 5 discharges the gases now cooled to a temperature at which water may be held in liquid phase into a reactor or exchange tower 8. This tower is constructed to stand substantially the same heavy pressure as the hydrogen generator and the gas passes into the base of the tower through a spray pipe 9 or similar distributing device. The exchange tower is packed with suitable catalytic material 10, the nature of which will be disclosed below, and is fed at the top with water through a pipe 11 and a distributor 12. Within the exchange tower there is a close contact between downwardly flowing water and the upwardly flowing gas while in the presence of the said catalytic agent and under its influence gaseous deuterium reacts with liquid water replacing a portion of the hydrogen therein so that the deuterium oxide content of the water is increased at the expense of the gas which therefore becomes richer in hydrogen.

The liquid drawn from the base of the tower 8 is conducted by a pipe 13 and a pump 14 through a heater or vaporizer 15 and is again discharged into reactor 1 by means of pipes 16 and 3 for further generation of hydrogen. The concentrated deuterium oxide or rather water enriched therein may be drawn off by a pipe 17 either continuously or at intervals. The water withdrawn by pipe 13 may be employed to carry powdered solid carried over from reactor 1 back again to the reactor.

Returning to the reactor 1, it will be recalled that the finely divided fluidized metal enters along with superheated steam by pipe 3. The fluidized metal enters the pipe 3 from a pipe 18 and in the reactor 1 a portion at least of the iron is converted to oxide and the solid, irrespective of its chemical composition, is maintained in the same fluidized form within the reactor and passes out therefrom by a pipe 19 and is conveyed as a flowing stream through a heater 20 and pipe 21 into a regenerator 22. Inert gas or hydrogen may be added through 19a in order to strip the solid free of deuterium before passing to the regenerator, but this is not required. Inert gas or steam is also added along the pipe 19, especially the vertical portion, so as to keep the solid thoroughly fluidized as indicated by the short pipe connections 19b. The gas so added is small in amount. The regenerator is preferably of similar construction to the reactor 1 with the central pipe 23 and devices 24 for separating solid from outgoing gas. Reducing gas is added to the reactor 22 through a pipe 26 and may be supplied from any convenient source by the compressor 27, or preferably the hydrogen taken from the top of the exchange tower 8 by a pipe 28 may be recirculated by means of booster pump 29 and fed through the pipe 26. If desired, all or a portion of this high pressure hydrogen may be led off by a pipe 30 and in that case additional reducing gas, such as water gas, must be supplied at 27 as mentioned before.

Within the regenerator 22, the fluidized metal oxide contained in the gases flows upwardly through the central pipe 23 just as in the other reactor and is separated at the upper end thereof into a denser phase and into a less dense phase. The spent reducing gases flow out by means of a pipe 31 and being highly heated they may be utilized to supply the heat for any suitable purpose. A part of this may be recirculated by pipe 31a and booster 31b. Moisture may be separated at 31c.

The heavier or denser phase within vessel 22 flows over the edge of pipe 23 and passes downwardly in the annular space between pipe 23 and vessel 22, and finds exit by means of pipe 32 which conducts the material into pipe 18 and thence into a reactor 1. Inert gas or steam may be added, if desired, to reactor 22 by pipe 32a in order to strip out the hydrogen before the solid is passed back to reactor 1 and gas or steam is also added to pipe 32, especially to the vertical portions thereof, to keep the solid therein in a fluidized state as indicated by the short pipe connections 32b. It should be appreciated that the iron oxide is largely reduced to iron again in the course of passing through the regenerator 22 and is therefore returned to reaction vessel 1 as the metal where it again produces a further quantity of hydrogen and deuterium.

As to the operation of the process, the hydrogen generator, the exchange tower and the regeneration vessel are all preferably operated under a high pressure, for example 5, 50, 100 or even 1,000 atmospheres or more. The temperature in the hydrogen generator or reaction vessel may vary considerably but is maintained between 350 to 900° C. The velocity of flow may also vary somewhat but is preferably within the range of .10 to 10.0 cu. ft. of fluidized mixture per second, upwardly through the central pipe. The ratio of iron to steam is likewise capable of some variation. Ordinarily about 15.0 pounds of the iron containing solid are provided per cubic foot of steam (the steam being measured in cubic feet under the pressure of operation) but this may be varied over a range of 1 to 30 pounds of iron per cubic foot.

The regeneration reaction is carried out preferably at a higher temperature, preferably say from 650 to 900° C., but it is best to maintain the temperature somewhat below 900° C. in order not to sinter the iron and thus reduce its reactivity. The velocity of flow is substantially the same within this vessel as in vessel 1 and the ratio of solids to gas may vary over the same range as given above. Preferably the amount of solids is about 5 pounds per cu. ft. of gas (measured at the conditions prevailing).

Vessels 1 and 22 are preferably constructed with outer, heavy, pressure-bearing walls and are lined with fire brick, asbestos cements or other resistant material. The pipe and exchanger surface are preferably of highly resistant steel, for example, alloys rich in chromium or nickel or both of these elements.

While various metals may be employed for producing hydrogen, it is preferred to use iron, and this may be obtained from hematite, magnetite, spathic or other iron ores, and it may be supplied from filings, borings and the like. Iron alloys may be employed instead of pure iron, for example iron alloys containing up to 10 or 15% of manganese or chromium are contemplated, and the reacting material may be distributed on an inactive support such as silica, silica gel, pumice, clays and the like. It has been found that soaking of the iron bearing reagents in a solution of sodium carbonate greatly increases their effectiveness.

In the above description, the process is described as if metallic iron is employed in one stage and oxidized to an oxide and reduced to metal again in the other stage. The process may actually be operated this way, but it is also possible for the iron or other material to pass from a lower oxide to a higher oxide and back to the lower again. For example FeO may be used to produce hydrogen and $Fe_3O_4$ is formed. This may be reduced again to FeO. For simplicity the process has been described as the cycle from metal to oxide and back to metal.

The exchange tower may be constructed in any desirable manner so as to obtain thorough contact between the gas and the liquid. It will be understood that the temperature of the exchange tower is preferably from say 20 to 100° C., but it may be operated at an even higher temperature depending on the pressure. It is necessary that it should be operated under sufficient pressure to maintain the water in a liquid phase. The tower may be packed with the solid catalyst or may be constructed as an ordinary plate and bell tower, with overflow pipes to allow the water to flow from an upper plate to one below and the catalytic material may be placed in the plates around the bells so that it will be in contact with both the liquid and the vapor phase when they come together, but the type of construction is not essential since any means of bringing the three materials together will be satisfactory. As stated above, the exchange tower is maintained under the full pressure under which the hydrogen is generated.

The catalyst may be described generally as a hydrogenating catalyst and many varieties of these materials may be employed, for example the 6th group metals, their oxides and sulfides, and preferably those of molybdenum, chromium and tungsten may be used, but other well known hydrogenation catalysts can also be employed such as iron, nickel or cobalt, either in the form of oxides, suboxides or metals, and noble metals such as palladium and platinum can be used. Mixtures of these various materials can be employed either with each other or in any of the usual catalyst supports such as activated carbon, silica, clay, silica gel, asbestos and the like.

With sulfide catalysts it has been found desirable to maintain an atmosphere of hydrogen sulfide. This may be supplied directly as hydrogen sulfide, but sulfur or organic sulfur compounds may be added. These may be added along with the water or directly injected with the hydrogen or elsewhere in the apparatus. The presence of this material maintains the sulfide catalysts at a high degree of activity. Such compounds may also be used in the presence of oxides of metals of the 6th group.

It should be noted that in the preferred method of operation illustrated above and shown in the drawing, streams of fluidized solids are passed in a cyclic path including the hydrogen generator and the regenerator in which the metal oxide is reduced again to the metal. It will also be noted that these streams pass in the cycle without the use of any pumps operating on the solid containing streams. This is effected by what might be termed the "hydrostatic" heads of the fluidized streams and the apparatus is carefully designed so as to permit this circulation. For example, the pressure developed by the material flowing through pipe 19 is the difference between the product of the density of the downflowing stream multiplied by the height from the upper edge of the pipe 2 to the lowest point in pipe 19, from which is subtracted the product of the density of the upflowing stream from the lowest point in pipe 19 to the upper edge of pipe 24. It will be noted that this difference should be sufficient to overcome the friction loss throughout the pipe 19. In the same manner, the pressure head should be sufficient to cause the flow of materials from the upper edge of pipe 23 downwardly through the annular space between pipe 23 and the vessel wall 22 through the line 32 and into the reactor 1. The densities of the particular fluidized streams are practically proportional to the solids content of these particular streams and it will be understood that these densities may be decreased by the addition of extraneous gas. Additional gas is ordinarily added to the flow lines at various points along the lines as indicated in the drawing in order to effect the proper relative densities at different points in the apparatus. The vessels 1 and 22 may be at the same level. On the other hand, either the one or the other may be at a more elevated point and, of course, any difference in elevation must be taken account of in the pressure calculations. For the reasons given above, it is necessary that the total pressures under which the two reactors are operated must be substantially the same, that is to say they must not differ by more than about 10 to 20 pounds per square inch and it is possible therefore to cause the circulation of this stream of fluidized solid to flow continuously round and round the cycle made up of the hydrogen generator and the recirculator, the density of the columns being continually kept at adjusted values to cause the flow.

To illustrate the effectiveness of this process, it may be appreciated that deuterium oxide occurs in natural water in a concentration of 1 to 6,000 and by the present process it may be concentrated to say 1 to 10%, depending on the conditions of operation in the exchange tower. For further concentration other methods are generally preferable.

While it is preferred to employ a circulating mass such as described above, it is within the contemplation of my invention to produce the hydrogen by a reaction of metal and superheated steam by discontinuous methods, for example using a plurality of stationary beds of the iron and iron oxide, which are alternately used to produce hydrogen from water and are alternately reduced again to the metal.

The present invention is not limited by any theory of operation either of the hydrogen generator, the regenerator or the exchange tower, or by any particular metal or metal oxide by which the hydrogen is produced, nor by any continuous or discontinuous mode of operation, catalyst and the like, but only by the following claims in which it is desired to claim all novelty inherent in the invention.

I claim:

1. A cyclic process for producing water of increased deuterium oxide content which comprises contacting steam with a stream of finely divided particles of a metal capable of reducing water under the reaction conditions prevailing, said contact taking place with the metal particles suspended in the stream at a temperature between 350° and 900° C. and at a superatmospheric pressure, thereby producing deuterium-containing hydrogen and particles of metal oxide; separating the deuterium-containing hydrogen and the metal oxide particles; contacting the deuterium-containing hydrogen with water under substantially the same superatmospheric pressure of hydrogen generation and at a temperature between 20° and 100° C., whereby deuterium replaces at least a portion of the molecularly-bound hydrogen in the water and the deuterium-containing hydrogen is simultaneously impoverished in deuterium; separating the deuterium-impoverished hydrogen from the water; contacting a stream of said metal oxide particles with said deuterium-impoverished hydrogen under substantially the same superatmospheric pressure of hydrogen generation and at a temperature between 650° and 900° C., the metal oxide particles being suspended in said deuterium-impoverished hydrogen, thereby reducing said metal oxide particles to metal particles; returning said metal particles to the zone of hydrogen production in a cyclic manner; and withdrawing at least a portion of the deuterium oxide-enriched water as product.

2. A process according to claim 1, wherein the metal is iron.

3. A cyclic process for producing water of increased deuterium oxide content which comprises continuously introducing liquid water into contact with deuterium-containing hydrogen at super-atmospheric pressure in the presence of a hydrogenation catalyst to replace with deuterium at least a portion of the molecularly bound hydrogen in the water, converging at least a portion of said deuterium-enriched water into steam, contacting the steam at an elevated temperature and under substantially the same super-atmospheric pressure with a flowing stream of finely divided particles of a metal in a lower oxidation state capable of reducing water under the reaction conditions prevailing, to form enriched hydrogen containing deuterium in a higher ratio with respect to the hydrogen than the ratio in normal water, while converting the metal to a higher oxide, separating the deuterium-enriched hydrogen and the stream of higher metal oxide particles at least in part, contacting the stream of finely divided particles of the said higher oxide of a metal with a reducing gas under reducing conditions at substantially the same super-atmospheric pressure to reduce said metal oxide particles to a lower state of oxidation, returning said stream of particles to the zone of hydrogen generation, passing the deuterium-enriched hydrogen into contact with the water continuously introduced into the process and withdrawing a portion of the deuterium enriched water as product.

4. A cyclic process for producing water of increased deuterium oxide content which comprises continuously introducing water into contact with deuterium-containing hydrogen under super-atmospheric pressure and at a temperature between 20° and 100° C., in the presence of a hydrogenation catalyst whereby deuterium replaces at least a portion of the molecularly bound hydrogen in the water and the deuterium-containing hydrogen is simultaneously impoverished in deuterium, separating the hydrogen from the water, converting at least a portion of said water of increased deuterium oxide content to steam, contacting the resulting steam with a stream of finely divided particles of a metal capable of reducing water under the reaction conditions prevailing, said contact taking place with the metal particles suspended in the stream at a temperature between 350° and 900° C. and at substantially the same super-atmospheric pressure of exchange between the deuterium-containing hydrogen and water, thereby producing enriched hydrogen containing deuterium in a greater ratio of deuterium to hydrogen than the ratio in ordinary water and forming particles of metal oxide, separating the deuterium-containing hydrogen and metal oxide particles, contacting a stream of said metal oxide particles with the above mentioned deuterium-impoverished hydrogen under substantially the same super-atmospheric pressure of deuterium exchange and hydrogen generation and at a temperature between 650° and 900° C., the metal oxide particles being suspended in said deuterium-impoverished hydrogen, thereby reducing said metal oxide particles to metal particles, returning said metal particles to the zone of hydrogen production in a cyclic manner, passing said enriched hydrogen into contact with the water continuously introduced into the process, and withdrawing at least a portion of the deuterium oxide enriched water as product.

5. A cyclic process for producing water of increased deuterium oxide content which comprises continuously introducing natural water countercurrently into contact with hydrogen containing deuterium in an exchange zone, under a superatmospheric pressure, whereby deuterium replaces at least a portion of the molecularly bound hydrogen in the water, converting at least a portion of the enriched water to steam, contacting said steam with a stream of finely divided particles of a metal capable of reducing water under the reaction conditions prevailing, thereby producing hydrogen containing deuterium in a ratio of deuterium to hydrogen greater than that in natural water, bringing said deuterium-rich hydrogen into contact with the water in said exchange zone, and withdrawing at least a portion fo the deuterium-enriched water as product.

6. A cyclic process for producing water of increased deuterium oxide content which comprises continuously introducing natural water countercurrently into contact with hydrogen containing deuterium in an exchange zone in the presence of a hydrogenation catalyst at a temperature of between 20° C. and 100° C. and at super-atmospheric pressure, whereby deuterium replaces at least a portion of the molecularly bound hydrogen in the water, converting at least a portion of the enriched water to steam, contacting said steam with a stream of finely divided particles of a metal capable of reducing water under the conditions prevailing, thereby producing hydrogen containing deuterium in a ratio of deuterium to hydrogen greater than that in natural water, bringing said deuterium-rich hydrogen into contact with the water in said exchange zone, and withdrawing at least a portion of the deuterium-enriched water as product.

References Cited in the file of this patent

UNITED STATES PATENTS

| Number | Name | Date |
|---|---|---|
| 2,134,249 | Hansgirg | Oct. 25, 1938 |
| 2,156,851 | Hansgirg | May 2, 1939 |
| 2,198,560 | Marshall | Apr. 23, 1940 |